United States Patent [19]

Konishi et al.

[11] 4,108,133

[45] * Aug. 22, 1978

[54] INTERNAL COMBUSTION ENGINE HAVING AN AUXILIARY COMBUSTION CHAMBER WITHOUT AN INTAKE VALVE

[75] Inventors: Masami Konishi, Toyota; Norihiko Nakamura, Mishima; Tatsuo Kobayashi; Toyokazu Baika, both of Susono, all of Japan

[73] Assignee: Toyota Jidosha Kogyo Kabushiki Kaisha, Toyota, Japan

[*] Notice: The portion of the term of this patent subsequent to Sep. 14, 1993, has been disclaimed.

[21] Appl. No.: 717,463

[22] Filed: Aug. 24, 1976

Related U.S. Application Data

[63] Continuation of Ser. No. 538,405, Jan. 3, 1975, abandoned.

[30] Foreign Application Priority Data

Jul. 31, 1974 [JP] Japan ................................. 49-87802
Jul. 31, 1974 [JP] Japan ................................. 49-87803
Jul. 31, 1974 [JP] Japan ................................. 49-87804

[51] Int. Cl.² ........................................... F02B 23/00
[52] U.S. Cl. ............................. 123/191 S; 123/32 C; 123/191 SP
[58] Field of Search ............. 123/32 C, 32 SP, 32 ST, 123/32 K, 191 S, 191 SP, 75 B

[56] References Cited

U.S. PATENT DOCUMENTS

| | | | |
|---|---|---|---|
| 1,926,499 | 9/1933 | Ricardo | 123/75 B |
| 2,690,742 | 10/1954 | Kuepfer | 123/32 C |
| 2,708,428 | 5/1955 | Fisher | 123/191 S |
| 2,858,812 | 11/1958 | Hoffmann | 123/32 C |
| 3,058,452 | 10/1962 | Espenschied | 123/32 C |
| 3,916,840 | 11/1975 | Geiger | 123/32 ST |
| 3,921,605 | 11/1975 | Wyczalek | 123/191 S |
| 3,930,471 | 1/1976 | Leonard et al. | 123/75 B |
| 3,980,057 | 9/1976 | Sanda et al. | 123/191 SP |

Primary Examiner—Charles J. Myhre
Assistant Examiner—David D. Reynolds
Attorney, Agent, or Firm—Stevens, Davis, Miller & Mosher

[57] ABSTRACT

An auxiliary combustion chamber shell of an internal combustion engine comprising a main combustion chamber having an intake valve and an exhaust valve, an auxiliary combustion chamber having no intake valve, a passage communicating the main and auxiliary combustion chambers, and an ignition spark plug whose electrode is positioned in the auxiliary combustion chamber. The auxiliary combustion chamber is pressed into a cylinder head to improve radiation effect, and held fast by the ignition spark plug. The auxiliary combustion chamber is divided into a high temperature portion adjacent to the communication passage and a secluded portion opposite the passage where the temperature is relatively low.

4 Claims, 4 Drawing Figures

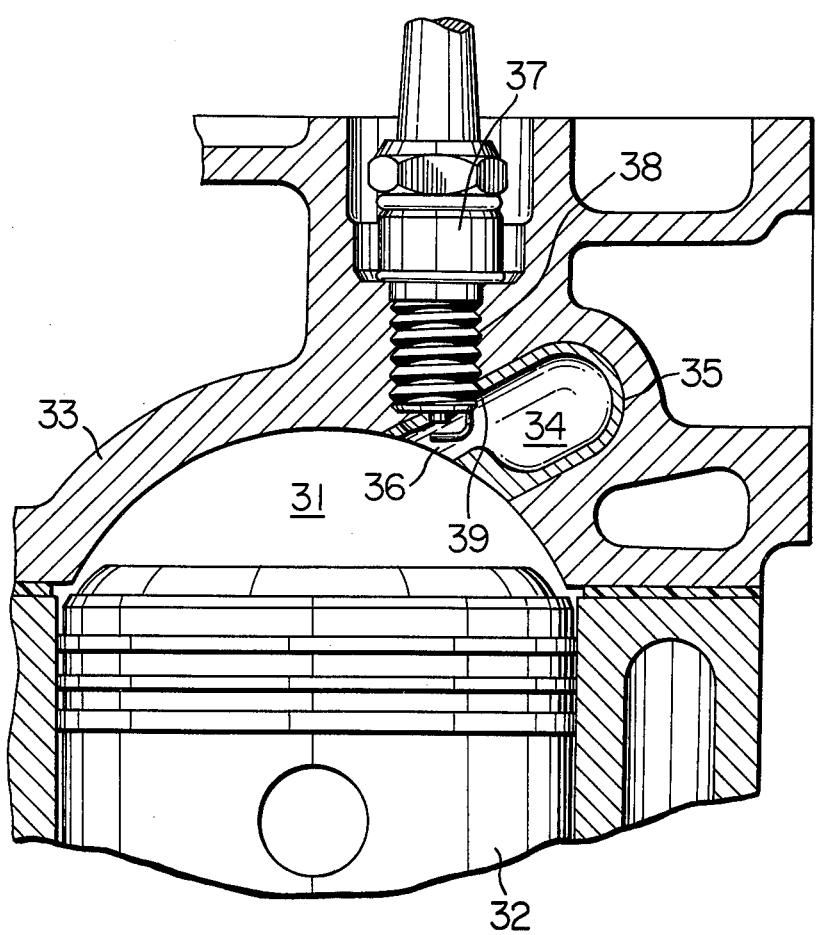

INTERNAL COMBUSTION ENGINE HAVING AN AUXILIARY COMBUSTION CHAMBER WITHOUT AN INTAKE VALVE

This is a continuation of application Ser. No. 538,405, filed Jan. 3, 1975, now abandoned.

BACKGROUND OF THE INVENTION

1. Field of the Invention

This invention relates to an auxiliary combustion chamber having no intake valve of an internal combustion engine which comprises a main combustion chamber having an intake and an exhaust valve, the auxiliary combustion chamber, a passage communicating the main and auxiliary combustion chambers, and an ignition spark plug whose electrode is positioned in the auxiliary combustion chamber.

2. Description of the Prior Art

It has been known to burn a lean fuel-air mixture so as to reduce such toxic substances as CO (carbon monoxide), HC (hydrocarbon) and NOX (nitrogen oxides) contained in the exhaust gas from internal combustion engines. However, such lean mixtures are not readily ignited and, in addition, are slow to propagate the flame, which results in the blow-by of the unburnt gas to the exhaust pipe or the reduction in thermal efficiency of the cycle. To overcome this, an internal combustion engine has been proposed that comprises a main combustion chamber having an intake and an exhaust valve and an auxiliary combustion chamber having an intake valve, wherein a lean fuel-air mixture is supplied to the main combustion chamber, while a relatively rich fuel-air mixture to the auxiliary combustion chamber, through their respective intake valves. In the internal combustion engine of this type, the relatively rich mixture in the auxiliary combustion chamber is first ignited and burnt, and then the lean mixture in the main combustion chamber is ignited by the flame from the auxiliary combustion chamber. This internal combustion engine equipped with the auxiliary combustion chamber having the intake valve has been very effective, insuring the combustion of the lean fuel-air mixture and propagating its flame rapidly. On the other hand, it is complex in structure because of the provision of the intake valve, which is opened and closed frequently, to the auxiliary combustion chamber and the provision of its kinds of mixture supply system for respective rich and lean mixture.

To eliminate the aforesaid shortcoming, the inventors have already proposed an internal combustion engine that comprises an auxiliary combustion chamber comprising a space having no intake valve, a main combustion chamber having an intake valve and an exhaust valve and communicated with said auxiliary combustion chamber through a passage, and an ignition plug whose electrode is situated in or near the passage of the auxiliary combustion chamber. In the internal combustion engine of this kind, a lean fuel-air mixture, which is drawn in through the intake valve on the intake stroke, is pushed into the auxiliary combustion chamber on the compression stroke, through the passage communicating the main and auxiliary combustion chambers. Because the elctrode of the ignition plug is placed in or near said passage, it is only the fuel-air mixture that exists thereabouts at the time of ignition. Accordingly, it ignites and burns the lean fuel-air mixture in the auxiliary combustion chamber, free from the influence of the burnt exhaust gas remaining therein. Subsequently, the lean fuel-air mixture in the main combustion chamber is burnt by the flame from the auxiliary combustion chamber.

However, in the above-described internal combustion engine, which has the auxiliary combustion chamber without the intake valve, the gas temperature in the auxiliary combustion chamber becomes very high, because combustion starts therein and the cooling effect of rich mixture is not available. This increases the quantity of toxic NOX contained in the exhaust gas produced in the auxiliary combustion chamber. Also, the auxiliary combustion chamber must be made of special metals, such as heat-resisting alloys, that are costly. Furthermore, there is a possibility that the auxiliary combustion chamber shell may move out of position by the frequent use of the engine under the influence of the high temperatures and pressures of said auxiliary combustion chamber.

OBJECTS OF THE INVENTION

An object of this invention is to provide an auxiliary combustion chamber shell that permits effective cooling.

Another object of this invention is to provide means for firmly holding the auxiliary combustion chamber shell without adding any special memeber.

A still further object of this invention is to provide an auxiliary combustion chamber shell that is available at low cost.

SUMMARY OF THE INVENTION

This invention relates to the installation, maintenance and construction of an auxiliary combustion chamber shell of an internal combustion engine comprising a main combustion chamber having an intake and an exhaust valve, an auxiliary combustion chamber formed in the auxiliary combustion chamber shell having no intake valve, a passage communicating the main and auxiliary comubstion chambers, and an ignition spark plug whose electrode is positioned in the passage. The auxiliary combustion chamber shell is pressed into a hole formed in a cylinder head to impove radiation effect, and held fast by the ignition spark plug for the simplification of construction. The auxiliary combustion chamber is divided into a high temperature portion adjacent to the communication passage and a secluded portion opposite to said passage where temperature is relatively low.

BRIEF DESCRIPTION OF THE DRAWINGS

Now this invention will be described in detail with reference to the accompanying drawings, in which:

FIG. 1 is a cross-sectional view of the combustion chambers of an internal combustion engine, with an auxiliary combustion chamber pressed in.

FIG. 2 is a cross-sectional view of the combustion chambers of another internal combustion engine, with an auxiliary combustion chamber pressed in.

FIG. 4 is a cross-sectional view of an auxiliary combustion chamber held by an ignition plug.

DETAILED DESCRIPTION OF THE INVENTION

Figure 1:
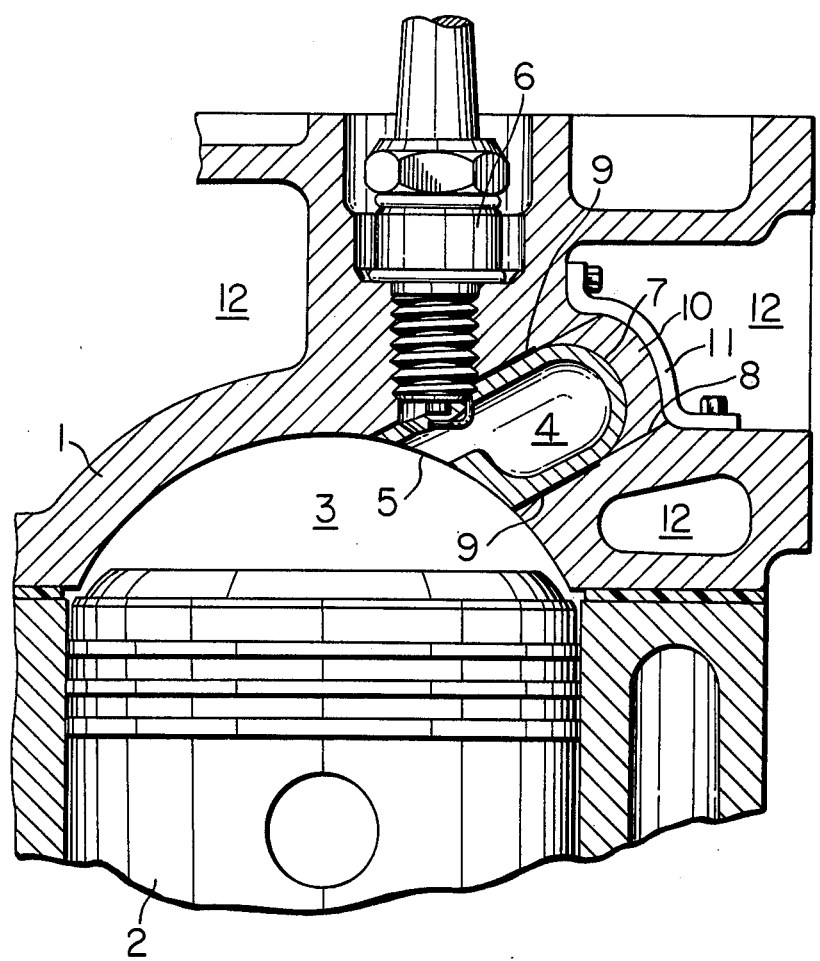

Referring first to FIG. 1, a main combustion chamber 3, surrounded by a cylinder head 1 and a piston 2, communicates with an auxiliary combustion chamber 4 through a passage 5. An electrode of an ignition spark plug 6 is situated in the passage 5. An auxiliary combustion chamber shell 7 is forced into an insertion hole 8 formed in the cylinder head 1 from the side opposite to the main combustion chamber 3, and fixed therein by a contact portion 9. In this embodiment, a segment 10 and a keep plate 11 are provided to prevent the auxiliary combustion chamber shell 7 from moving out of the hole 8. Cooling is effected by a cooling water passage 12.

In the auxiliary combustion chamber 7 of the abovedescribed construction, the contact portion 9 has a high thermal conductivity. Consequently, the heat inside the auxiliary combustion chamber 4 is well conducted to the cooling water in the cooling passage 12.

Figure 2:
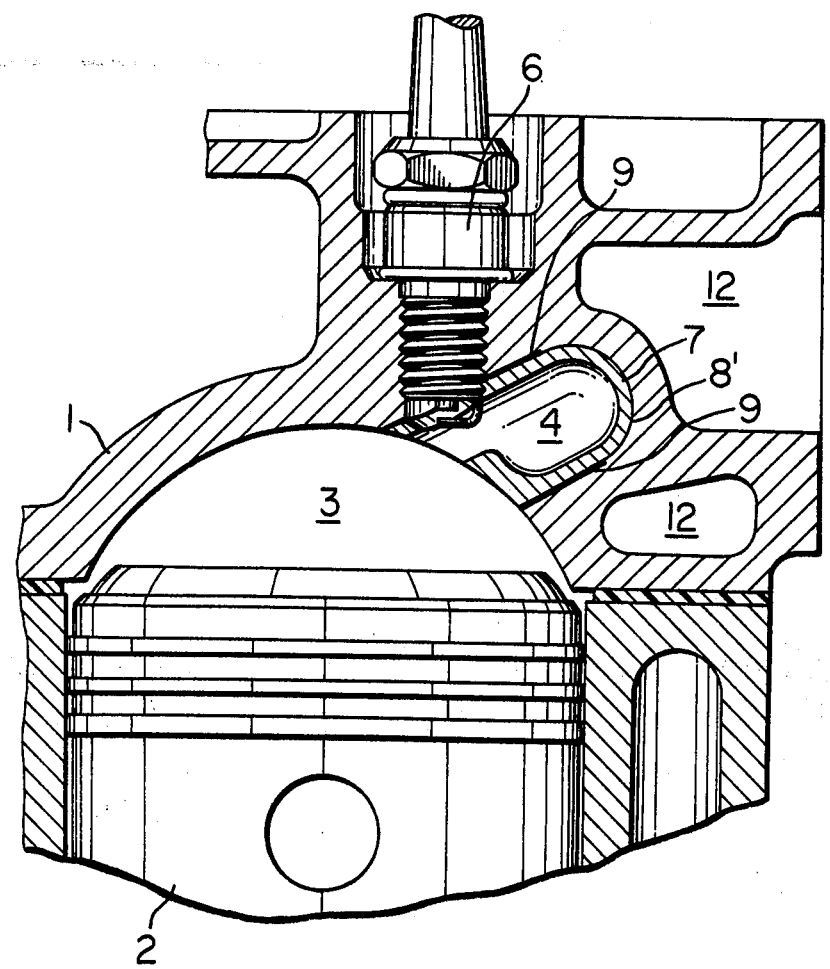

Now another embodiment of this invention will be described with reference to FIG. 2. Because this embodiment resembles the one shown in FIG. 1 in almost all respects, similar parts will be designated by similar reference numerals, with their detailed description omitted.

The feature of this embodiment lies in that a hole 8' formed in the cylinder head 1 does not communicate with the cooling water passage 12, but is a blind recess bored from the main combustion chamber side of cylinder head 1. That is, the auxiliary combustion chamber shell 7 is pressed into the blind hole 8' from the main combustion chamber side of cylinder head 1. As a consequence, the combustion pressure in the main combustion chamber presses the auxiliary combustion chamber shell 7 into the hole 8' in the cylinder head 1, thus preventing said auxiliary combustion chamber 7 from moving outwardly away from the main combustion chamber 3. Therefore, the auxiliary combustion chamber can be pressed into place without requiring great power, suffers from less trouble caused by residual stress, and can be manufactured and assembled with ease.

The hole 8' is not limited to a blind one, but may be of any kind so far as it is bored from the main combustion chamber side of the cylinder head.

As may be understood from the above, this invention offers many remarkable advantages, such as the improved cooling effect of the auxiliary combustion chamber due to the press fitting portion and its durability, reduction in the production of NOX and the cost of manufacture, and the ease with which it can be assembled and incorporated into the cylinder head.

Figure 3:
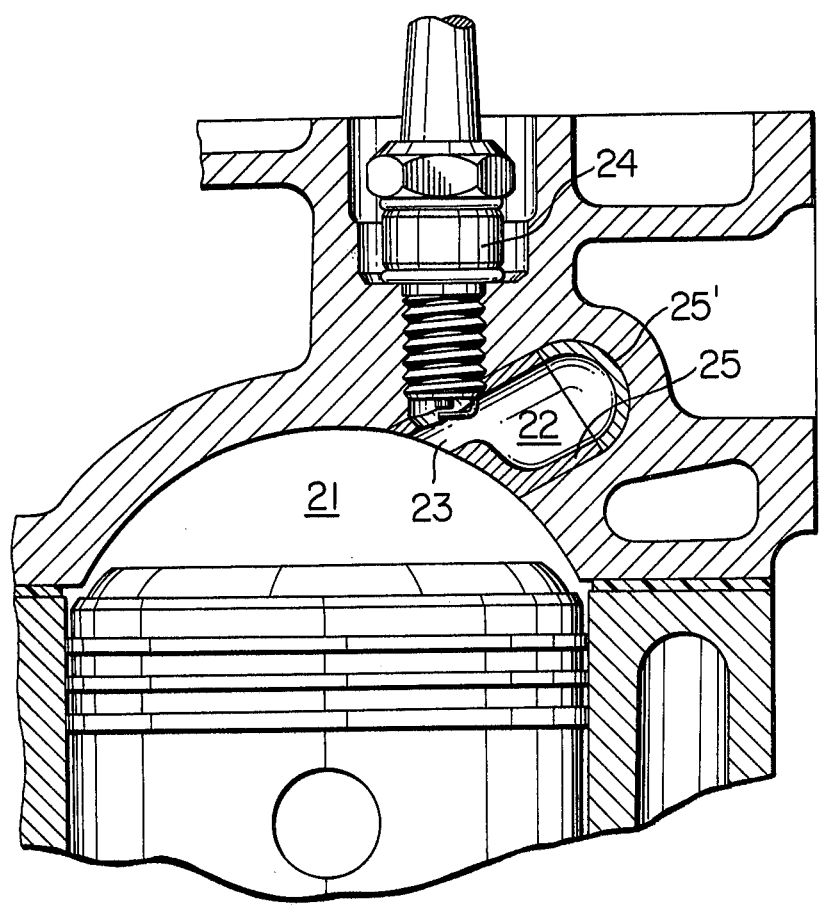
FIG. 3 is a cross-sectional view of a divided auxiliary combustion chamber.

Referring now to FIG. 3, the main combustion chamber 21 and the auxiliary combustion chamber 22 are communicated by the passage 23, in which the electrode of the ignition spark plug 24 is placed. The auxiliary combustion chamber 22 consists of a plurality (two in the case of this embodiment) of divided auxiliary combustion chamber shells 25 and 25'. The shell 25 forms that side of the auxiliary combustion chamber 22 which is near the passage 23 where temperature is high, while the shell 25' forms a portion opposite to the passage 23 where temperature is relatively low.

The auxiliary combustion chamber can thus be divided into sections, such as the shells 25 and 25' that are more suitable for machineworking, which results in improved productivity and lower cost. In the auxiliary combustion chamber, temperature is highest near the passage, and relatively low in the secluded portion opposite thereto. Accordingly, cost reduction can be achieved by using costly heat-resisting material for only the divided portion on the passage side, and not for the opposite portion where temperature is relatively low.

This division also makes it easy to work the inside of the auxiliary combustion chamber, thereby enlarging the design tolerance of tis shape.

Finally, reference is made to FIG. 4. A main combustion chamber 31 consists of a space surrounded by a piston 32 and a cylinder head 33. The cylinder head 33 is fitted, preferably by pressing, with an auxiliary combustion chamber shell 35 that forms an auxiliary combustion chamber 34. The electrode of an ignition spark plug 37 is placed in a passage 36 that communicates the main combustion chamber 31 with the auxiliary combustion chamber 34. Part of the tip of the threaded portion 38 of the ignition spark plug 37 is engaged with an engaging portion 39 formed in the auxiliary combustion chamber shell 35, by which means the auxiliary combustion chamber shell 35 is held by the ignition spark plug 37. The tip of the threaded portion 38 of the ignition spark plug 37, which engages with the auxiliary combustion chamber shell 35, need not be substantially threaded. Also, the engaging portion 39 may be threaded to keep the ignition spark plug and the auxiliary combustion chamber shell in engagement.

As described above, the auxiliary combustion chamber shell of this invention, which is fixed in the cylinder head by pressing or other means, is prevented from loosening under the influence of temperature difference between them. Therefore, the auxiliary combustion chamber is securely fixed under all operating conditions.

As will be understood from the above, this invention improves the durability of the auxiliary combustion chamber shell of the internal combustion chamber having the auxiliary combustion chamber without an intake valve. Furthermore, according to this invetnion, the auxiliary combustion chamber shell is held fast, and manufactured at lower cost than conventionally.

What we claim is:

1. An internal combustion engine comprising:
   a cylinder;
   a cylinder head;
   a reciprocable piston snugly received in said cylinder;
   said cylinder head and said piston defining a main combustion chamber therebetween;
   means defining a blind hole in said cylinder head, the open end of said blind hole opening into said main combustion chamber and the opposite end of said blind hole most remote from said main combustion chamber being completely closed;
   an auxiliary combustion chamber shell defining an auxiliary combustion chamber therein, said shell being pressedly fitted in said blind hole from the main combustion chamber so that the entire exterior surface of the auxiliary combustion chamber shell tightly contacts the wall of the blind hole, said auxiliary combustion chamber having no intake valve;
   a passage communicating said auxiliary combustion chamber with said main combustion chamber; and
   an ignition spark plug having an electrode positioned in said passage whereby a substantially uniform lean fuel-air mixture, drawn into the main combustion chamber through an intake valve on the intake stroke of the piston, is forced into the auxiliary combustion chamber on the compression stroke of the piston and ignited and burned thereby igniting and burning the lean fuel-air mixture in the main combustion chamber by the torch flame via said passage from the auxiliary combustion chamber.

2. An internal combustion chamber as claimed in claim 1, wherein:

said ignition spark plug has a threaded portion thereon screwed into a threaded inner wall of a hole formed in the cylinder head, said plug having its longitudinal axis slanted with respect to the axis of the auxiliary combustion chamber, and part of the threaded portion of said ignition spark plug being engaged with an engaging portion formed in the auxiliary combustion chamber shell so that the shell is held in place by the ignition spark plug.

3. An internal combustion engine as claimed in claim 1 wherein, the auxiliary combustion chamber shell is divided into a plurality of individual sections.

4. An internal combustion engine comprising:
a cylinder head,
a piston,
said cylinder head and the top of said piston defining a main combustion chamber therebetween,
a hole in cylinder head which opens into the main combustion chamber,
a shell defining an auxiliary combustion chamber therein, said shell being pressedly fitted in said hole,
said auxiliary combustion chamber having no intake valve,
a passage communicating said auxiliary combustion chamber with said main combustion chamber, and
an ignition spark plug having a threaded portion, said threaded portion abutting a portion of said shell so that said shell is held in place by the ignition spark plug, and
an electrode of said ignition spark plug positioned in said passage.

* * * * *